(12) United States Patent
Base et al.

(10) Patent No.: US 12,460,572 B1
(45) Date of Patent: Nov. 4, 2025

(54) GEAR SHAFT AND INTERNAL COMBUSTION ENGINE HAVING A GEAR SHAFT

(71) Applicant: DEERE & COMPANY, Moline, IL (US)

(72) Inventors: Douglas S. Base, Ankeny, IA (US); Richard T. Hurban, Cedar Falls, IA (US); Sachin W. Pawar, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/795,389

(22) Filed: Aug. 6, 2024

(51) Int. Cl.
*F02B 67/04* (2006.01)
*F01M 9/00* (2006.01)
*F01M 11/02* (2006.01)
*F16H 57/04* (2010.01)

(52) U.S. Cl.
CPC ............... *F02B 67/04* (2013.01); *F01M 9/00* (2013.01); *F01M 11/02* (2013.01); *F16H 57/04* (2013.01)

(58) Field of Classification Search
CPC . F02B 67/04; F01M 9/00; F01M 9/10; F01M 11/02; F16H 57/021; F16H 57/04; F16H 57/0402
See application file for complete search history.

(56) References Cited

U.S. PATENT DOCUMENTS

| | | | | |
|---|---|---|---|---|
| 1,915,330 A | * | 6/1933 | Morrill | F01M 11/02 184/6.12 |
| 3,929,117 A | * | 12/1975 | Green | F01M 1/10 123/196 R |
| 4,321,896 A | * | 3/1982 | Kasting | F02B 67/04 123/195 A |
| 7,080,620 B2 | * | 7/2006 | Aronsson | F01M 11/065 123/196 R |
| 10,969,000 B2 | * | 4/2021 | Slayter | F16H 57/043 |
| 11,162,573 B2 | * | 11/2021 | Sung | F16H 57/043 |
| 11,543,018 B2 | * | 1/2023 | Kisaichi | F16H 57/0423 |
| 11,662,015 B2 | * | 5/2023 | Hagerman | F16H 57/0484 475/252 |
| 2005/0049101 A1 | * | 3/2005 | Kumashi | F16H 48/08 475/160 |

FOREIGN PATENT DOCUMENTS

CN 213655658 U 7/2021

* cited by examiner

*Primary Examiner* — Grant Moubry

(57) ABSTRACT

An internal combustion engine and a gear shaft includes a first axial side, a second axial side opposite from the first axial side, a radially outer surface, a gear interface at the radially outer surface, a central passageway extending axially from the first axial side to an internal junction, an upper passageway extending radially upward from the internal junction to the gear interface, and a cavity disposed radially below the internal junction, extending radially downward, terminating between the internal junction and the gear interface, and configured to receive debris conveyed with the lubricant.

19 Claims, 3 Drawing Sheets

GEAR SHAFT AND INTERNAL COMBUSTION ENGINE HAVING A GEAR SHAFT

BACKGROUND

An internal combustion engine may include one or more gears to operate a valvetrain, accessories, and/or other functions of the engine. The engine may further include a lubrication system that conveys a lubricant to an engine block, a cylinder head, and/or other portions of the engine to lubricate and cool the components of the engine.

SUMMARY

In accordance with aspects of the present disclosure, a gear shaft for operating in an internal combustion engine is provided. The gear shaft includes a gear rotation axis configured to define rotation of a gear rotating on the gear shaft, a first axial side, a second axial side opposite from the first axial side, a radially outer surface, a gear interface at the radially outer surface configured for rotation of the gear at the gear interface relative to the gear shaft, a central passageway extending axially from the first axial side to an internal junction and configured to convey a lubricant from the first axial side to the internal junction, an upper passageway extending radially upward from the internal junction to the gear interface and configured to convey the lubricant from the internal junction to the gear interface, and a cavity disposed radially below the internal junction, extending radially downward, terminating between the internal junction and the gear interface, and configured to receive debris conveyed with the lubricant.

The gear shaft may further include two openings extending axially through the gear shaft and configured for fasteners to extend therethrough to couple the gear shaft to the internal combustion engine. The upper passageway may extend radially upwardly between the two openings. The upper passageway may extend radially upwardly along an upper passageway axis that is disposed at an upper passageway angle from a vertical axis extending directly upward from the internal junction. The upper passageway angle may be less than 45 degrees. The upper passageway angle may be less than 30 degrees. The upper passageway angle may be less than 15 degrees. The upper passageway may extend radially upward to form an upper passageway length, and wherein the cavity may extend radially downward to form a cavity length that is less than the upper passageway length. The upper passageway may have an upper passageway width that is equal to a cavity width of the cavity. The gear interface may be configured to convey the lubricant from the upper passageway across the radially outer surface and support rotation of a bearing relative to the gear shaft. The gear shaft may further include a lip disposed at the second axial side and extending radially outwardly, the lip may be configured to axially position the gear such that the lubricant is conveyed from the radially outer surface radially outwardly between the lip and the gear.

In accordance with aspects of the present disclosure, an internal combustion engine includes an engine casing comprising an engine block and a cylinder head, at least one cylinder disposed in the engine block, at least one piston configured to reciprocate within the at least one cylinder, a crankshaft configured to convert reciprocation of the at least one piston into rotational energy in the engine block, a gear configured to receive the rotational energy of the crankshaft and rotate about a gear rotation axis on a gear shaft, a bearing disposed between the gear and the gear shaft, and a lubrication system comprising an engine lubricant passageway extending in the engine casing and conveying a lubricant through the engine casing, a central passageway extending axially through the gear shaft from the engine lubricant passageway to an internal junction to convey the lubricant from the engine lubricant passageway to the internal junction, an upper passageway extending radially upward from the internal junction to the bearing to convey the lubricant from the internal junction to the bearing, and a cavity disposed radially below the internal junction, extending radially downward, and terminating between the internal junction and the bearing to receive debris conveyed with the lubricant.

The bearing may be fixed to the gear. The bearing may include at least one bushing press fit to the gear. The at least one bushing may include two bushings press fit to the gear. The internal combustion engine may include at least two fasteners coupling the gear shaft to the engine casing through two axially extending openings of the gear shaft, wherein the upper passageway of the lubrication system may extend radially upwardly between the two openings. The upper passageway may extend radially upward to form an upper passageway length, and wherein the cavity may extend radially downward to form a cavity length that is less than the upper passageway length. The upper passageway may have an upper passageway width that is equal to a cavity width of the cavity. The lubrication system may convey the lubricant from the upper passageway axially and circumferentially between the bearing and the gear. The gear shaft may further comprise a lip extending radially outwardly, and wherein the lip of the gear shaft may axially position the gear on the gear shaft such that the lubricant is conveyed from between the bearing and the gear radially outwardly between the lip and the gear and between the engine casing and the gear.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
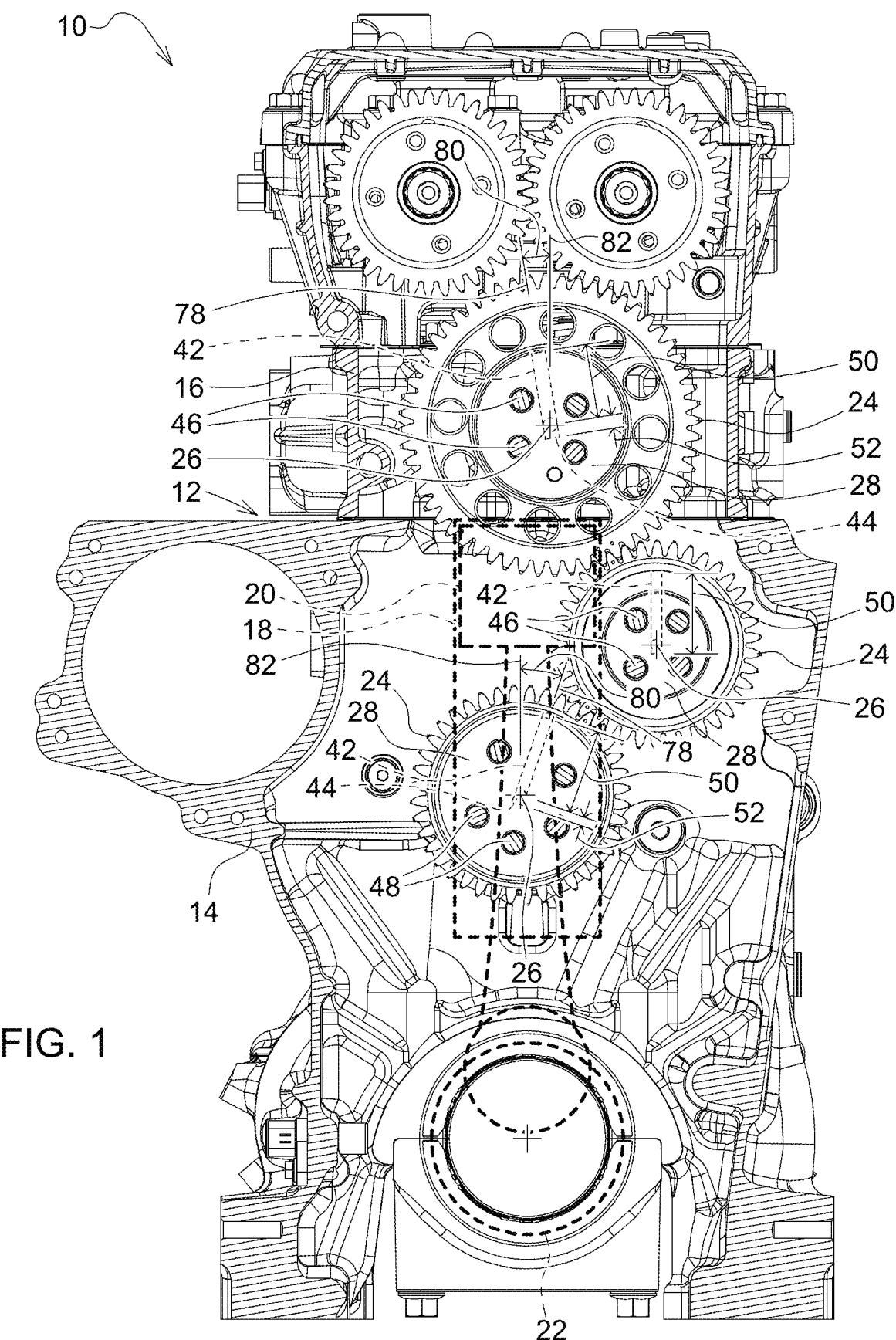
FIG. 1 illustrates an internal combustion engine in accordance with an embodiment of the present disclosure.
Figure 2:
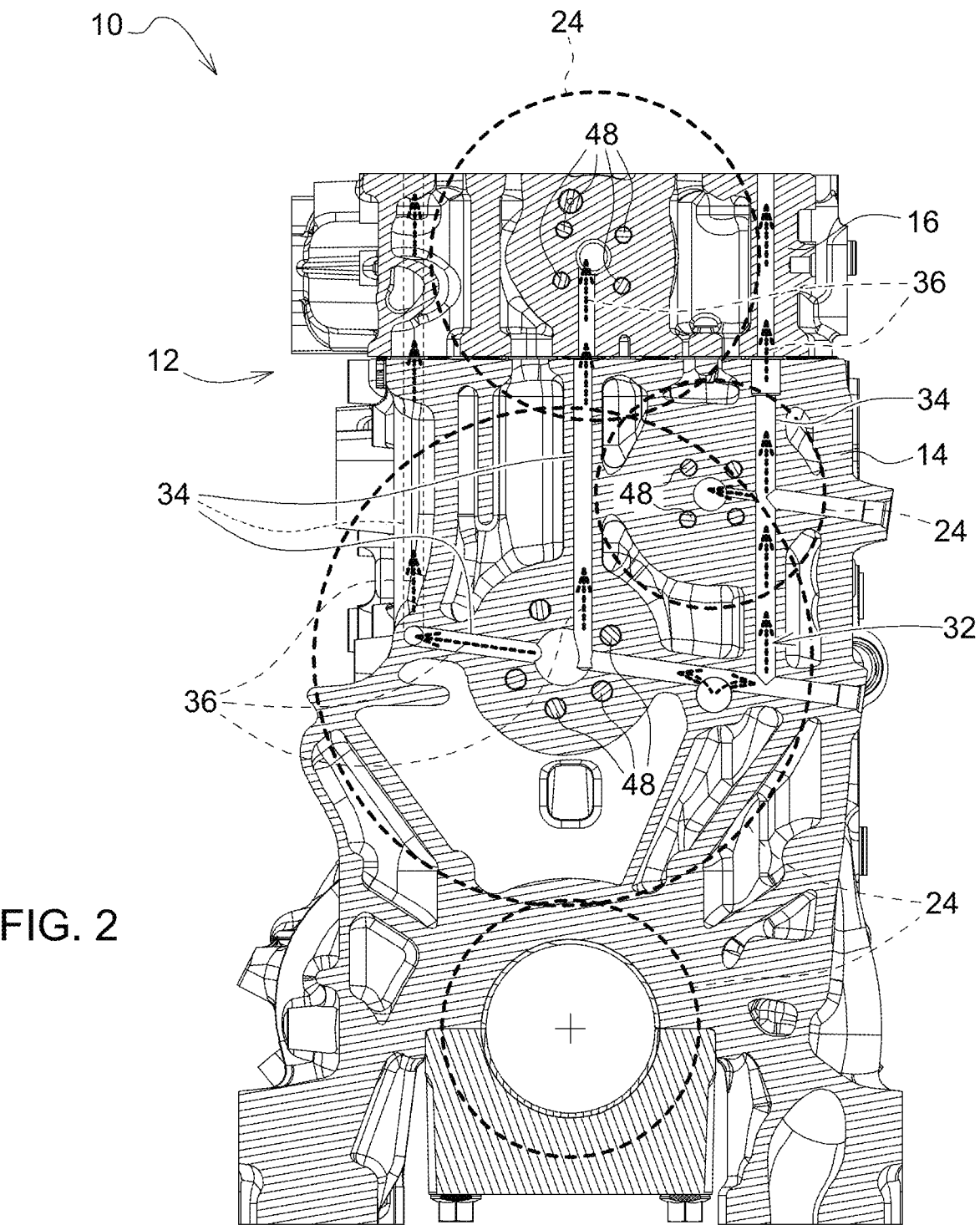
FIG. 2 illustrates an internal combustion engine in accordance with an embodiment of the present disclosure.

Referring to FIGS. 1 and 2, an internal combustion engine 10 in accordance with one or more embodiments of the present disclosure is illustrated. The internal combustion engine 10 shown in FIG. 1 is a diesel engine but may be a spark ignition or other type of compression ignition engine in one or more embodiments of the present disclosure.

The engine 10 of FIG. 1 includes an engine casing 12 that has an engine block 14 and at least one cylinder head 16. In additional embodiments, the engine casing 12 may include two or more cylinder heads 16.

The engine 10 of FIG. 1 further includes at least one cylinder 18 disposed in the engine block 14. The engine 10 further includes at least one piston 20 configured to reciprocate within the at least one cylinder 18. The engine 10 further includes a crankshaft 22 configured to convert reciprocation of the at least one piston 20 into rotational energy or force in the engine block 14. The engine 10 further includes a valvetrain (not shown) disposed at the cylinder head 16 to operate valves that control flow of air and/or fuel into the cylinder(s) 18 and flow of exhaust gas from the cylinder(s) 18 during operation of the engine.

Referring now to FIG. 2 with continuing reference to FIG. 1, the engine 10 further includes at least one gear 24 configured to receive the rotational energy of the crankshaft 22, directly or indirectly, and rotate about a gear rotation axis 26 on a gear shaft 28. In the illustrated embodiment, multiple gears 24 are shown including one or more idler gear(s), camshaft gear(s), and crankshaft and/or flywheel gear(s). Any one or more of such gears may be utilized with embodiments of the gear shaft 28 described herein.

Figure 3:
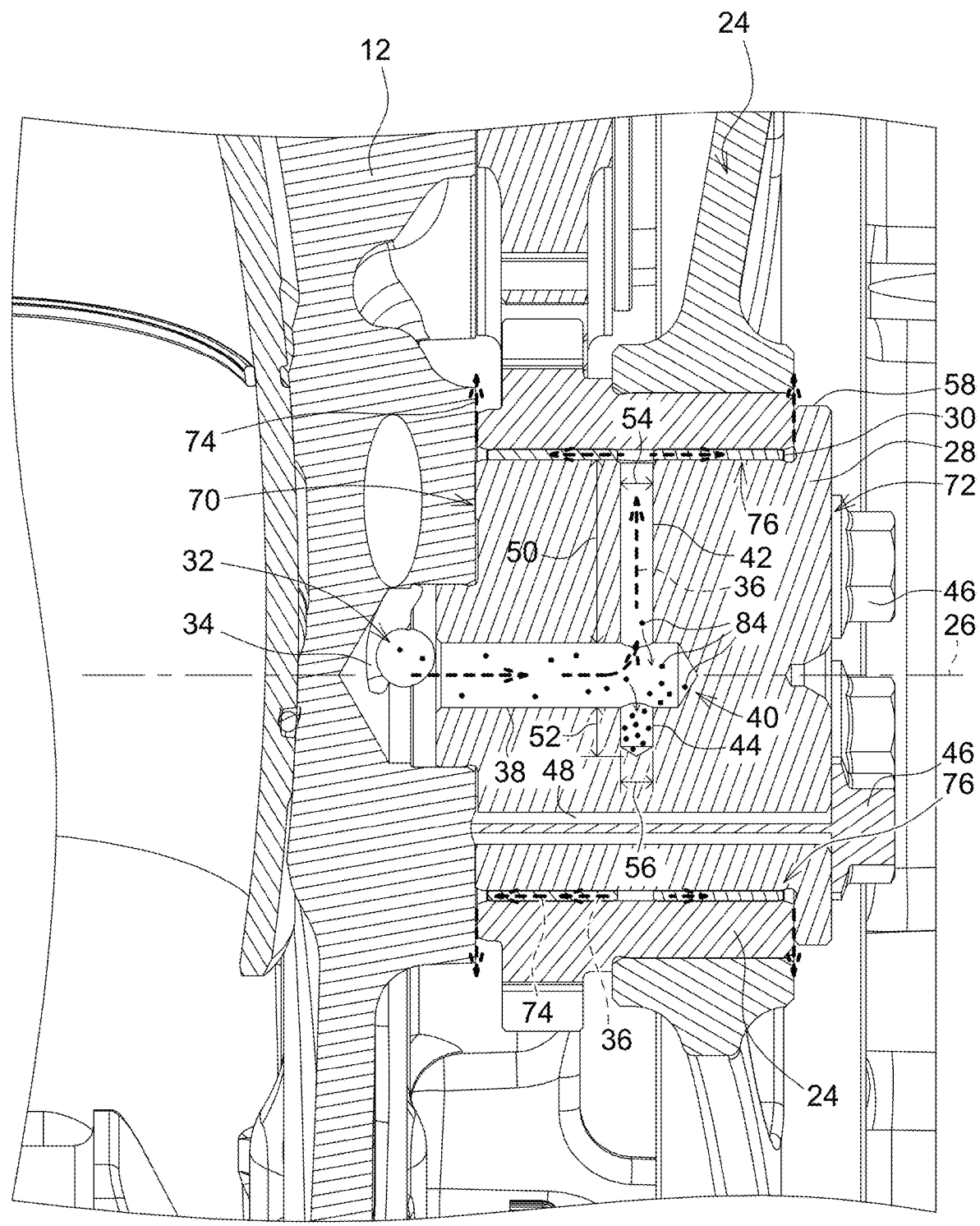
FIG. 3 is a cross-sectional view of a gear shaft in accordance with an embodiment of the present disclosure.

Referring now to FIG. 3, the engine 10 further includes a bearing 30 disposed between the gear 24 and the gear shaft 28. The bearing 30 may include any plain, ball, or other type of bearing and is a bushing in embodiments. The bearing 30 may include multiple bearings or bushings in one or more embodiments. In an embodiment, the bearing 30 is fixed to the gear 24. In the illustrated embodiment, the bearing 30 is one or two bushings press fit or interference fit to the inner diameter of the gear 24.

In the illustrated embodiment of FIG. 1, multiple gear shafts 28 are included on the engine 10, and each gear shaft 28 may or may not include any one or more features or functions as described in accordance with the embodiments described herein.

The gear shaft 28 includes a first axial side 70 and a second axial side 72 opposite from the first axial side 70 as illustrated in FIG. 3. The gear shaft 28 further includes a radially outer surface 74. A gear interface 76 is disposed at the radially outer surface 74 of the gear shaft 28 and is configured for rotation of the gear 24 at the gear interface 76 relative to the gear shaft 28.

Referring again to FIG. 2, the engine 10 further includes a lubrication system 32 having at least one engine lubricant passageway 34 extending in the engine casing 12 and conveying a lubricant 36 through the engine casing 12.

As shown in FIGS. 2 and 3, the lubrication system 32 and the gear shaft 28 further include a central passageway 38 extending axially through the gear shaft 28 from the engine lubricant passageway 34 to an internal junction 40 to convey the lubricant 36 from the engine lubricant passageway 34 to the internal junction 40. The central passageway 38 extends axially from the first axial side 70 to the internal junction 40 as illustrated in the embodiment of FIG. 3. The central passageway 38 is configured to convey the lubricant 36 from the first axial side 70 to the internal junction 40 in an embodiment.

The lubrication system 32 and the gear shaft 28 further include an upper passageway 42 extending radially upward from the internal junction 40 to the gear interface 76 and/or the bearing 30 to convey the lubricant 36 from the internal junction 40 to the gear interface 76 and/or the bearing 30 as shown in FIGS. 1 and 3. Any reference herein to an upward direction or a position above an element may refer to a direction that is opposite from a general direction of the force of gravity, and any reference herein to a downward direction or a position below an element may refer to a direction corresponding with the general direction of the force of gravity.

The lubrication system 32 and the gear shaft 28 further include a cavity 44 disposed radially below the internal junction 40 as shown in FIG. 3. The cavity 44 extends radially downward in the illustrated embodiment. The cavity 44 further terminates between the internal junction 40 and the gear interface 76 and/or the bearing 30 to receive other liquids, solids or other particles or debris conveyed with the lubricant. During operation of the engine 10, the lubricant 36 flows through the internal junction 40 before flowing upward through the upper passageway 42. Due to the position, orientation, and other physical characteristics of the upper passageway 42, the internal junction 40, and the cavity, debris suspended in or otherwise conveyed by the lubricant 36 falls or moves downward by the force of gravity into the cavity 44.

The engine 10 further includes multiple fasteners 46 coupling the gear shaft 28 to the engine casing 12 through corresponding axially extending openings 48 of the gear shaft 28. The upper passageway 42 extends radially upwardly between two of the openings 48 in the illustrated embodiment of FIGS. 1 and 2.

As shown in FIG. 1, the upper passageway 42 extends radially upwardly along an upper passageway axis 78 that is disposed at an upper passageway angle 80 from a vertical axis 82 extending directly upward from the internal junction 40. The upper passageway angle 80 is less than 45 degrees in an embodiment, less than 30 degrees in an embodiment, and less than 15 degrees in an embodiment. Further, in one or more embodiments, there are multiple gear shafts 28 each having different or the same upper passageway angles 80. The specific upper passageway angles 80 disclosed herein enable the benefits of debris reduction or removal and availability of the lubricant 36 upon startup described further herein.

FIGS. 1 and 3 illustrate the upper passageway 42 extending radially upward to form an upper passageway length 50. The cavity 44 extends radially downward to form a cavity length 52 that is less than the upper passageway length 50 in the illustrated embodiment. The upper passageway 42 in the illustrated embodiment has an upper passageway width 54 that is equal to a cavity width 56 of the cavity 44. In another embodiment not illustrated, the upper passageway width 54 is greater than the cavity width 56, and the upper passageway width 54 is less than the cavity width 56 in another embodiment not illustrated.

As shown in FIG. 3, the lubrication system 32 conveys the lubricant 36 from the upper passageway 42 axially and circumferentially between the bearing 30 and the gear 24.

Referring again to FIG. 3, the gear shaft 28 further includes a lip 58 in the illustrated embodiment extending radially outwardly. The lip 58 of the gear shaft 28 axially positions the gear 24 on the gear shaft 28 such that the lubricant 36 is conveyed from the radially outer surface 74 and/or between the bearing 30 and the gear 24 radially outwardly between the lip 58 and the gear 24 on an axially inner side of the gear 24 and between the engine casing 12 and the gear 24 on an axially outer side of the gear 24 in the illustrated embodiment. In additional embodiments not illustrated, a washer or other elements may be included adjacent to the gear 24 at the axially inner and/or outer sides of the gear 24 to axially position the gear 24.

Without in any way limiting the scope, interpretation, or application of the claims appearing below, a technical effect of one or more of the example embodiments disclosed herein is to provide the lubricant 36 to one or more of the gear(s) 24 and/or the bearing(s) 30 of the engine 10 while removing or reducing debris in the lubricant 36, which reduces wear and improves durability and efficiency of the engine 10. Debris removal or reduction is accomplished by the position and/or orientation of the upper passageway 42, including the upper passageway angle 80, in cooperation with the cavity 44 and adjacent elements as described in accordance with various embodiments herein. As illustrated in FIG. 3, debris particles 84 are suspended in or otherwise carried or moved by the lubricant 36 through the central passageway 38 at a velocity relatively lower than the velocity at which the lubricant 36 may then move through upper passageway 42. Due to the debris particles 84 having higher density than the lubricant 36 and being subjected to this acceleration from the central passageway 38 to the upper passageway 42, gravity, and/or the termination of the central passageway 38 at the junction 40, the debris particles 84 fall, settle, or otherwise move downward and collect in the cavity 44. Such falling, settling, or otherwise downward movement may occur during operation of the engine 10 or while the engine 10 is shutdown.

Further, the engine 10 and the gear shaft 28 of various embodiments described herein enable or improve the availability of the lubricant 36 to be supplied to the engine 10 upon start-up. After shutdown of the engine 10, hydrodynamic forces and other effects allow the lubricant 36 to be stored or held in the upper passageway 42 that is oriented upward and remain at the gear interface 76 or adjacent to the bearing 30. Accordingly, upon start-up, the lubricant 36 is present in or at the gear shaft 28, the gear interface 76, and/or the bearing 30 to provide lubrication and cooling to components to improve durability and efficiency of the engine 10.

Any one or more features, structures, and/or functions of any embodiment(s) of the engine 10 and/or the gear shaft 28 described or shown herein may be added to or combined with one or more other embodiment(s) of the engine 10 and/or the gear shaft 28 described or shown herein, or omitted from such embodiment(s), to form one or more additional embodiment(s) of the engine 10 and/or the gear shaft 28 or related methods in accordance with the present disclosure. Additionally, any one or more steps, processes, and/or methods of any embodiment(s) of the engine 10 and/or the gear shaft 28 described or shown herein may be added to or combined with one or more other embodiment(s) of the engine 10 and/or the gear shaft 28 described or shown herein, or omitted from such embodiment(s), to form one or more additional embodiment(s) of the engine 10 and/or the gear shaft 28 or related methods in accordance with the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., unless described differently, are used descriptively for the figures, and may not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A gear shaft for operating in an internal combustion engine, the gear shaft comprising:
   a gear rotation axis configured to define rotation of a gear rotating on the gear shaft;
   a first axial side;
   a second axial side opposite from the first axial side;
   a radially outer surface;
   a gear interface at the radially outer surface configured for rotation of the gear at the gear interface relative to the gear shaft;
   a central passageway extending axially from the first axial side to an internal junction and configured to convey a lubricant from the first axial side to the internal junction;
   an upper passageway extending radially upward from the internal junction to the gear interface and configured to convey the lubricant from the internal junction to the gear interface; and
   a cavity disposed radially below the internal junction, extending radially downward, terminating between the internal junction and the gear interface, and configured to receive debris conveyed with the lubricant.

2. The gear shaft of claim 1, further comprising:
   two openings extending axially through the gear shaft and configured for fasteners to extend therethrough to couple the gear shaft to the internal combustion engine;
   wherein the upper passageway extends radially upwardly between the two openings.

3. The gear shaft of claim 1, wherein the upper passageway extends radially upwardly along an upper passageway axis that is disposed at an upper passageway angle from a vertical axis extending directly upward from the internal junction.

4. The gear shaft of claim 3, wherein the upper passageway angle is less than 45 degrees.

5. The gear shaft of claim 3, wherein the upper passageway angle is less than 30 degrees.

6. The gear shaft of claim 3, wherein the upper passageway angle is less than 15 degrees.

7. The gear shaft of claim 1, wherein the upper passageway extends radially upward to form an upper passageway length, and wherein the cavity extends radially downward to form a cavity length that is less than the upper passageway length.

8. The gear shaft of claim 1, wherein the upper passageway has an upper passageway width that is equal to a cavity width of the cavity.

9. The gear shaft of claim 1, wherein the gear interface is configured to convey the lubricant from the upper passageway across the radially outer surface and support rotation of a bearing relative to the gear shaft.

10. The gear shaft of claim 9, further comprising a lip disposed at the second axial side and extending radially outwardly, the lip being configured to axially position the gear such that the lubricant is conveyed from the radially outer surface radially outwardly between the lip and the gear.

11. An internal combustion engine comprising:
an engine casing comprising an engine block and a cylinder head;
at least one cylinder disposed in the engine block;
at least one piston configured to reciprocate within the at least one cylinder;
a crankshaft configured to convert reciprocation of the at least one piston into rotational energy in the engine block;
a gear configured to receive the rotational energy of the crankshaft and rotate about a gear rotation axis on a gear shaft;
a bearing disposed between the gear and the gear shaft;
a lubrication system comprising
an engine lubricant passageway extending in the engine casing and conveying a lubricant through the engine casing;
a central passageway extending axially through the gear shaft from the engine lubricant passageway to an internal junction to convey the lubricant from the engine lubricant passageway to the internal junction;
an upper passageway extending radially upward from the internal junction to the bearing to convey the lubricant from the internal junction to the bearing; and
a cavity disposed radially below the internal junction, extending radially downward, and terminating between the internal junction and the bearing to receive debris conveyed with the lubricant.

12. The internal combustion engine of claim 11, wherein the bearing is fixed to the gear.

13. The internal combustion engine of claim 11, wherein the bearing comprises at least one bushing press fit to the gear.

14. The internal combustion engine of claim 13, wherein the at least one bushing comprises two bushings press fit to the gear.

15. The internal combustion engine of claim 11, further comprising at least two fasteners coupling the gear shaft to the engine casing through two axially extending openings of the gear shaft, wherein the upper passageway of the lubrication system extends radially upwardly between the two openings.

16. The internal combustion engine of claim 11, wherein the upper passageway extends radially upward to form an upper passageway length, and wherein the cavity extends radially downward to form a cavity length that is less than the upper passageway length.

17. The internal combustion engine of claim 11, wherein the upper passageway has an upper passageway width that is equal to a cavity width of the cavity.

18. The internal combustion engine of claim 11, wherein the lubrication system conveys the lubricant from the upper passageway axially and circumferentially between the bearing and the gear.

19. The internal combustion engine of claim 18, wherein the gear shaft further comprises a lip extending radially outwardly, and wherein the lip of the gear shaft axially positions the gear on the gear shaft such that the lubricant is conveyed from between the bearing and the gear radially outwardly between the lip and the gear and between the engine casing and the gear.

* * * * *